United States Patent
Shatzkamer et al.

(10) Patent No.: US 8,780,909 B2
(45) Date of Patent: Jul. 15, 2014

(54) SYSTEM AND METHOD FOR MODIFYING MEDIA PROTOCOL FEEDBACK LOOP BASED ON MOBILE SYSTEM INFORMATION

(75) Inventors: Kevin Shatzkamer, Hingham, MA (US); Richard Christopher Hayes, Raleigh, NC (US); Mark Grayson, Maidenhead (GB); Jayaraman Iyer, San Jose, CA (US); Timothy Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 13/426,268

(22) Filed: Mar. 21, 2012

(65) Prior Publication Data

US 2013/0250761 A1    Sep. 26, 2013

(51) Int. Cl.
*H04L 12/28* (2006.01)

(52) U.S. Cl.
USPC .......................................... 370/391; 370/389

(58) Field of Classification Search
USPC ......... 370/349, 229, 230, 232, 233, 234, 235, 370/253
See application file for complete search history.

(56) References Cited

U.S. PATENT DOCUMENTS

| 2012/0192230 A1* | 7/2012 | Algie et al. ..................... 725/38 |
| 2013/0163430 A1* | 6/2013 | Gell et al. ..................... 370/235 |

* cited by examiner

*Primary Examiner* — Brenda H Pham
(74) *Attorney, Agent, or Firm* — Wilmer Cutler Pickering Hale and Dorr LLP (57) ABSTRACT

Systems and methods for modifying a media protocol based on subscriber and network performance information is disclosed. Media protocols such as adaptive bitrate protocol can adjust bit rates based on conditions perceived at the mobile device and with a goal of obtaining the highest bit rate possible. The media protocols residing on the mobile device do not have access to network performance information that can change rapidly and impact the experience at the mobile device. For example, congestion, radio air link interference, handoffs, and quality of service parameters can all impact the experience a user has when accessing media files from a mobile device. The requests made by a mobile device can be modified to take into account these factors to enhance the user experience.

20 Claims, 6 Drawing Sheets

SYSTEM AND METHOD FOR MODIFYING MEDIA PROTOCOL FEEDBACK LOOP BASED ON MOBILE SYSTEM INFORMATION

FIELD OF THE DISCLOSURE

This disclosure relates generally to mobile wireless networking, and specifically to a system and method for using mobile wireless network information to modify media protocol performance.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology. The range of the wireless communication technology can vary depending on the deployment. These applications use media protocols to stream media such as video and audio from media servers to client programs running on mobile devices. Example media protocols include adaptive bitrate (ABR), real time streaming protocol (RTSP), and real-time transport protocol (RTP). These protocols are designed to work efficiently over large and distributed networks such as the Internet.

DESCRIPTION OF EXAMPLE EMBODIMENTS

Overview

In some embodiments, a method is disclosed that comprises inspecting messages received to determine when a received message is a media protocol request message from the user equipment that is intended to request a fragment of a video stream from the media server at a specified bit rate. The term 'inspecting' in this context includes any activity associated with examining, analyzing, identifying, processing, or otherwise evaluating a message (or certain portions thereof). The method may further include receiving a media protocol request message from a user equipment that is traveling to a media server to request a fragment of a video stream at a specified bit rate, correlating information from the media protocol request message with network performance information and subscriber preference parameters, and modifying the specified bit rate of at least one media protocol request message based on the network performance information and subscriber preference parameters.

Example Embodiments

This disclosure relates generally to modifying media protocols running over a communication network based on mobile system information. As mobile devices have become more powerful, there has been an increased demand for more and better services on these devices. One of these services is the ability to access and view multimedia content with mobile devices. This has created problems because Internet applications and websites rely on media protocols that were generally created to communicate video and audio multimedia over a wired network or that fail to account for aspects of how some networks operate. Running multimedia applications on wireless network can create challenges including policy and billing issues that are present in some wireless networks.

Some of the current media protocols, such as adaptive bitrate technologies for video, are heavily dependent on an application (such as a client plug-in) running on the mobile device for performing a variety of tasks. These tasks can include monitoring video performance, building results from this monitoring, and requesting specific fragments from a video server based on these results. This client focused approach can impact the network and the user experience in a number of unintended and problematic ways. For example, operators can optimize network traffic through rate limiting and other such policies that cause media protocols such as adaptive bitrate to adapt to the optimization in unpredictable and unwanted ways. Further, many subscriber plans are tiered with data usage caps, but without throughput limitations. As media protocols proliferate, some may adapt to use the highest possible bandwidth, which can have undesirable or unintended impacts on subscribers and/or the network. More generally, the problem is that subscriber profile and preference information is not taken into account when determining how to delivery media. For example, running a movie at the highest bandwidth may produce very little benefit to the user because of the size of the display or other factors, but the impacts of the high bandwidth can result in quickly consuming a monthly data quota or using scare network resources. If greater range of factors were taken into account when delivering the media, then the network can better provide the "best experience" to subscribers based on a more complete set of parameters.

These problems can be addressed by intercepting media protocol requests in the communication network at an intermediary network element and using network-based and/or policy-based logic to determine the response to the request. The network-based logic can include policy control, identity database, and location systems to understand how to adapt the media protocol and align the performance with subscriber preferences. The subscriber preferences can be stored in the intermediary network element and used with the network information to modify the media protocol's adaptations. The modifications can be performed by adding information into a request or modifying the client requests through interception to allow the media protocol to operate more efficiently and in a more predictable fashion.

As one example of communications using media protocols, a user visits a video streaming web site using a mobile device. When the user chooses a video to view, a client program running on the mobile device contacts a video server on the Internet to request video content using media protocols. The video server sends the requested video content to the client program on the mobile device using the media protocols. How the video content is requested, delivered, and displayed depends on the specifics of the media protocol employed. A client running on the mobile device can specify the media protocol used in retrieving the video content.

Adaptive bit rate (ABR) is one example of a media-aware technique for delivering media using web protocols. ABR streaming switches dynamically among media files of differing bit rates, or overall quality and size, to allow for a smooth viewing or listening experience for the user. Adaptive bit rate technologies for video are typically dependent on a client program running on the user device capable of monitoring video performance, building dynamic empirical results from this monitoring, and requesting a specific media fragments from a stateless video server based on these results. The design of ABR is to provide high quality media to users by automatically adapting playback conditions to dynamic and changing conditions of the network. Generally, ABR is designed to select the highest bit rate for media to improve the quality of the media streamed to the client. However, the higher the bit rate or quality of the media streamed over the network, the higher the amount of network resources used, such as bandwidth. ABR utilizes HTTP protocol (a stateless connection) and independent, temporally segmented media fragments. This allows the client to acquire segments independently, nonlinearly, and on-demand. These characteristics provide certain performance characteristics such as rapid start-up playback.

The design of ABR is to adjust dynamically the requested bit rate from the client based on perceived network conditions. Traditionally, ABR clients request media fragments sequentially, requesting the next media fragment as the ABR client approaches the end of the currently playing fragment to provide a seamless experience to the user. The ABR client uses video quality measurements to adjust dynamically the requested bit rate of the next media fragment. One of these video quality measurements can be dropped packets. If the ABR client determines that there have been no problems in delivery of the video, the ABR client may request a higher bit rate for the next media fragment. If the ABR client determines that the video quality is suffering, the ABR client may request a lower bit rate for the next media fragment. However, ABR servers are stateless, meaning that an ABR client may request a media fragment encoded at any bit rate.

When running on a mobile network, the design of ABR does not adapt well to enabling media streaming over mobile networks or any finite-resource network in which policy enforcement, optimization and pricing plans are used as a mechanism to control data usage. For example, the mobile policy control framework allows the service provider to optimize transport of traffic. These optimizations can cause ABR to adapt in unpredictable, and often undesired, ways. Also, mobile service provider billing plans may be tiered, with monthly bandwidth caps but seldom with throughput limitations. Accordingly, as faster and more advanced mobile wireless networks proliferate, ABR protocols are designed to request bit rates based on the highest possible bandwidth, which might be undesirable to mobile subscribers who are paying for limited amounts of data. The present system and method leverages the dynamic and stateless design of ABR protocols to modify ABR requests based on mobile system information.

Figure 1:
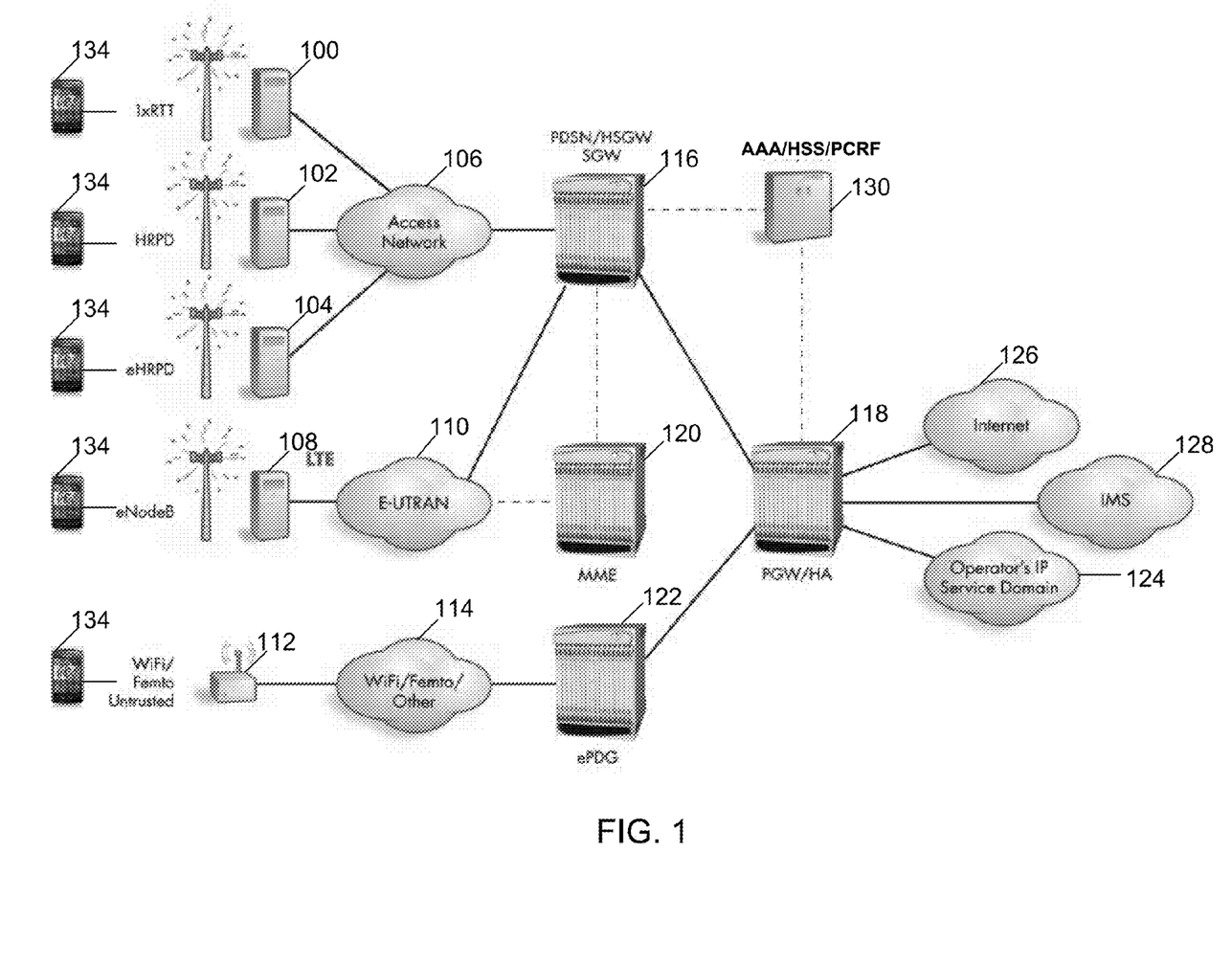
FIGS. 1-2 illustrate communication networks including a long term evolution (LTE) topology for media protocol modification in accordance with some embodiments.

The present system and method of media protocol modification may be used across many different communication networks, including mobile networks such as GSM, GPRS, UMTS, and LTE; wireless networks such as Wi-Fi; or wired networks such as Local Area Network (LAN) or Wide Area Network (WAN). FIG. 1 illustrates a communication network that includes a media protocol modification mechanism in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. As described above, the present media protocol modification may be implemented on any of these technologies. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network. The radio access technology provides communication with a user equipment (UE) 134 wirelessly. The radio access technology can use radio frequency signaling to create a radio link between the UE 134 and the transceiver, such as eNodeB 108.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, such as a packet data network gateway (PGW), and a mobility management entity (MME) 120. In some embodiments, the anchor gateway 118 provides mobile system information such as user information via the PGW or HA for use in modifying media protocols. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both. In some embodiments, the AAA/HSS/PCRF 130 provides mobile system information such as subscriber identity information, identity databases, or location systems for use in modifying media protocols.

The Home Subscriber Server (HSS) 130 can be a master user database that supports IMS network entities that handle calls. The HSS 130 stores mobile system information such as subscription-related information (subscriber profiles), performs authentication and authorization of the user, and can provide mobile system information about the subscriber's location and IP information. The AAA server 130 can provide authentication, access control, and accounting to the network. The authentication can involve verification of the mobile subscriber, the access control can involve granting or denying access to specific services, and the accounting that can take place is the tracking of the use of network resources by mobile subscribers. Other servers, such as the Home Location Register (HLR), can be used in other embodiments. As described above, the media protocol modification system may receive any of the mobile system information described above from the HSS, AAA server, or HLR to modify media protocol fragment requests. In some embodiments, the AAA/HSS/PCRF 130 communicates with the access gateway 116 for charging purposes. The policy charging and rules function provides determines policy rules in a communication network. The PCRF operates in the network core and accesses subscriber information and other functions to make policy decisions and provide instructions to other elements in the network. It should be understood that the PCRF can be implemented as a standalone entity in the network or in combination with another network element depending on the embodiment.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. The media protocol modification system may receive the mobile system information described above, such as subscriber location information, from the MME 120. In some embodiments, one or more EPC components can be implemented on the same gateway or network device as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state user equipment (UEs), the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages mobile system information such as Quality of Service (QoS), online/offline flow-based charging data generation, deep-packet inspection, and lawful intercept. Accordingly, the PGW 118 can provide mobile system information for use to modify media protocols. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. As described above, the media protocol modification system may receive mobile system information, such as subscriber location information, from the MME. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
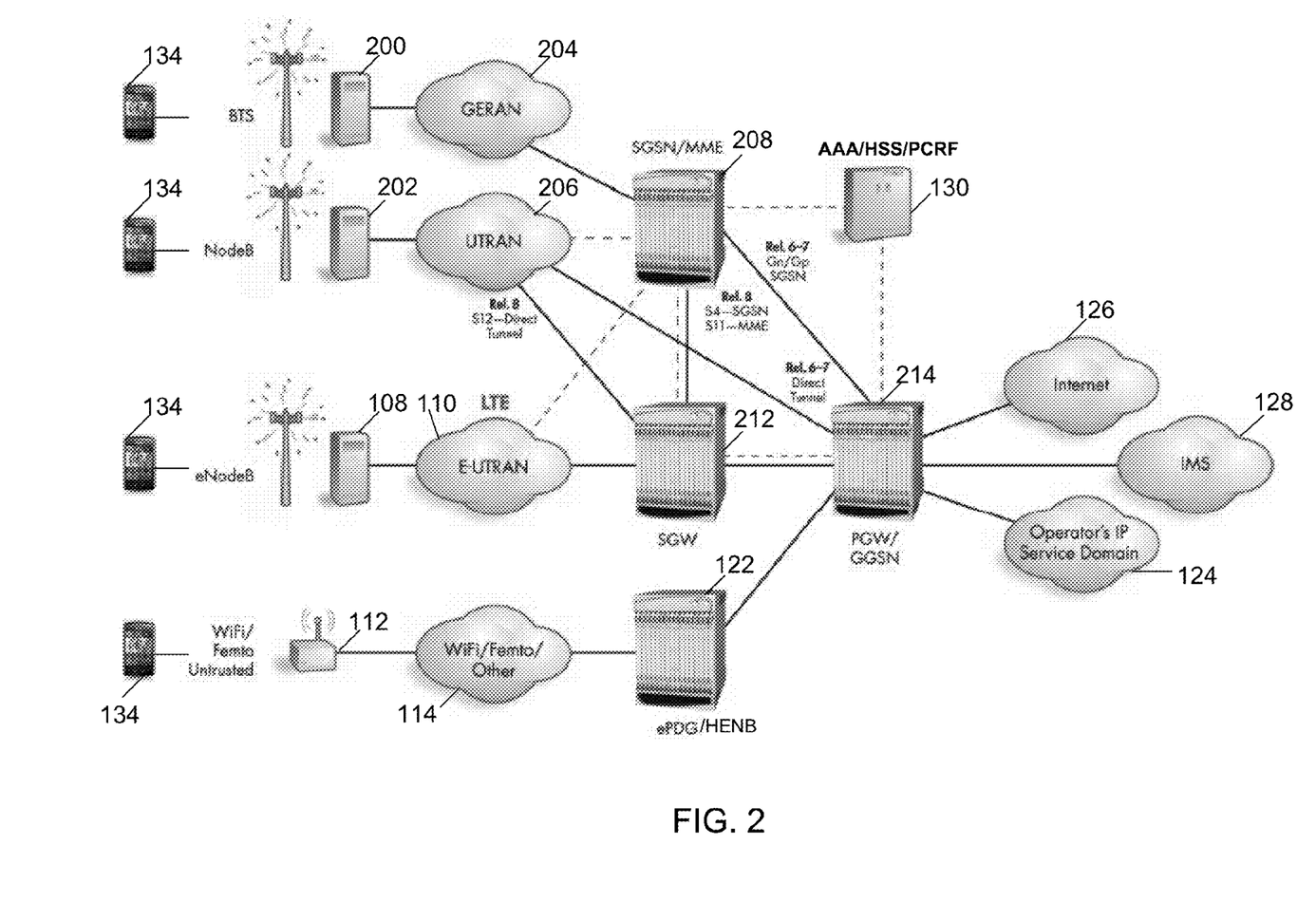

FIG. 2 illustrates a communication network that implements a media protocol modification mechanism with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214. The media protocol modification system may receive mobile system information from the SGSN/MME 208 or from the GGSN/PGW 214.

In some embodiments, the media protocol modification mechanism can be implemented on an intermediary node. The intermediary node can be a gateway, such as PDSN/HSGW/SGW 116, PGW/HA 118, PGW/GGSN 214, or any other network device capable of intercepting media protocol requests and accessing network information. An intermediary node may include functionalities such as a policy enforcement point, an application-layer load balancer such as hardware capable of load balancing the hypertext transfer protocol (HTTP), a stateful firewall capable of inspecting application-layer network traffic, or a media optimization engine such as a video optimization gateway. An intermediary node may include hardware capable of deep packet inspection, including hardware capable of inspecting network traffic up to the application layer. The intermediary node may include a policy enforcement point capable of enforcing policies related to user equipment.

The intermediary node can access and maintain mobile system information relating to the mobile communication session, the mobile subscriber, the radio bearers, and the subscriber policies relating to the mobile communication session. The intermediary node can be stateful or stateless—meaning it could be a true HTTP proxy for ABR requests, or a transparent DPI engine. The intermediary node may or may not see the bearer traffic—e.g., it can act on the ABR requests and without seeing the media files. Optionally, it may want to see the media files when it needs to perform some level of optimization. If the media protocol modification is implemented on gateway 116, the gateway may be used to provide various services to a mobile device and implement the quality of service (QoS) on packet flows. The communication networks also allow provision of applications such as streaming video, streaming music, and a variety of content delivered to user equipment. Residing within the intermediary node can be one or more network processing units (NPUs), interfaces, modules, and memory. The memory can be a computer readable medium that is non-transitory and tangible.

Figure 3:
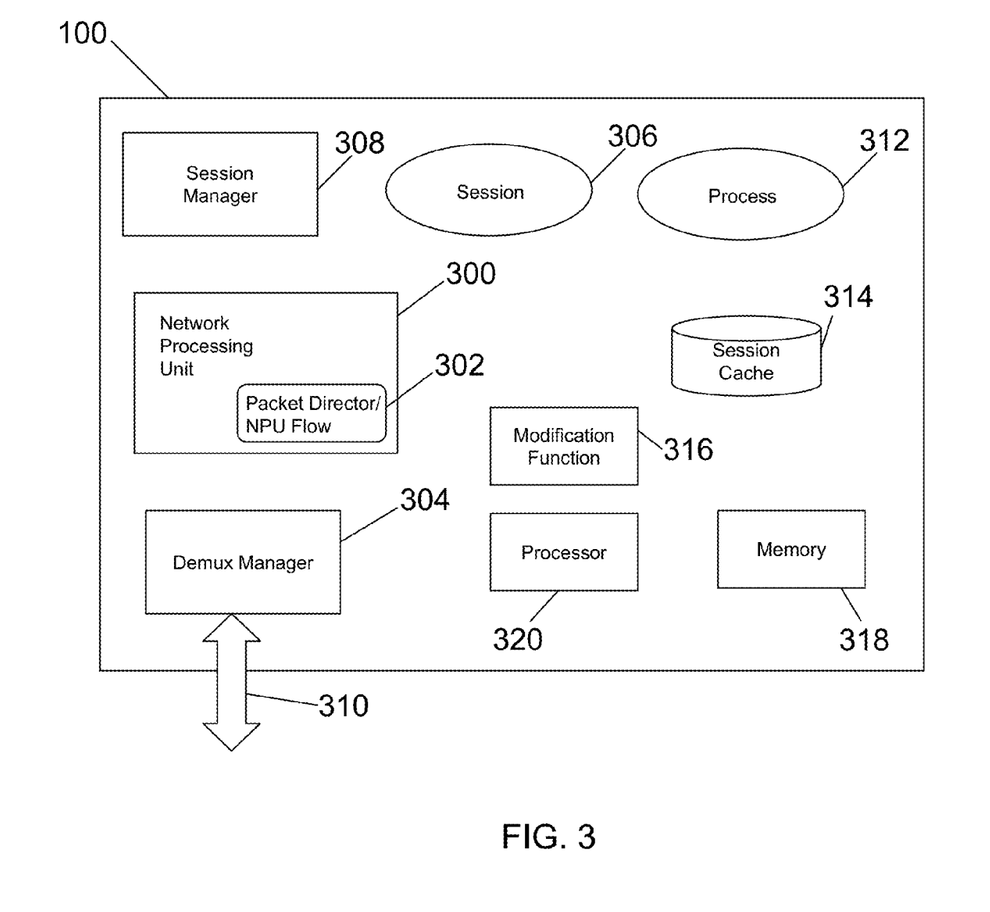
FIG. 3 illustrates a logical view of a network device for media protocol modification in accordance with some embodiments.

FIG. 3 illustrates a logical view of an intermediary node that implements media protocol modification in accordance with certain embodiments. In FIG. 3, the intermediary node includes a network processing unit (NPU) 300, a packet director/NPU flow 302, a demux manager 304, sessions 306, a session manager module 308, an input/output interface 310, a process 312, a session cache 314, modification function 316, memory 318, and a processor 320. Interface 310 includes one or more physical connections that can be either wired or wireless to communicate information to and from NPU 300. Session manager module 308 works with interface 310 to provide signals to communicate information from NPU 300 and to receive information from interface 310.

The NPU 300 receives electrical or optical signals on interface 310 from the access networks and transmits network information such as media fragments, data packets, and mobile system information to mobile devices. The NPU 300 is capable of performing deep packet inspection to modify media protocols. Deep packet inspection refers to a form of data packet analysis that examines a data packet to obtain information as it is processed by an intermediary node. The processor 320 can be one or more integrated circuits that are a multipurpose, programmable, clock-driven, register-based electronic device that accepts binary data as input, processes it according to instructions stored in its memory, and provides results as output. In some embodiments, the processor 320 can be constructed for a specific purpose such as a network processing unit 300 to perform media protocol modification or another specific task.

Memory 318 can be any type of computer readable medium such as random access memory (RAM), programmable read-only memory (PROM), a field programmable gate array (FPGA), flash memory, optical disk drive, or magnetic storage medium. The memory 318 can be used to store computer programs or logic that can be run on processor 320. The memory 318 can also store information such as data structures and other data that is used for providing media protocols and for providing mobile system information relevant to media protocol modification such as Quality of Service, wireless performance information, mobile performance information, end-to-end system performance information, subscriber behavior, subscriber profile, policy control, identity databases, and location systems. The session manager 308 can be hardware or software for performing media protocol modification. The session manager 308 can receive mobile system information on interface 310. In this fashion, the session manager 308 can use mobile system information to modify media protocol requests in some embodiments.

The processor 320 and memory 318 are used to provide session manager 308, packet director 302, and demux manager 304. For example, session manager 308 and processor 320 can include information stored in memory 318 upon which action is taken by processor 320. In some embodiments, session manager 308 can be implemented as a module that is a combination of hardware and software. Session manager 308 includes data stored in memory 318 such as media protocol parameters, mobile system information, and configuration information. Multiple session managers 308 can be used in an intermediary node. The session managers 308 can communicate with NPU 210 to modify media protocol requests using mobile system information.

When a user equipment connects to the mobile wireless network through an eNodeB 108, a mobile subscriber session 306 is created between the user equipment and intermediary node. In FIG. 3, the session manager 308 manages a plurality of mobile subscriber sessions 306 and may also authenticate the subscriber with a policy charging and rules function (PCRF) through a mobile subscriber session 306 with the user equipment. The result is that the PCRF can use the interface 310 to send mobile system information, including policy information and instructions regarding QoS and services to be provided to the subscriber's data, to the intermediary node. The session manager 308 can use this policy information in managing the mobile subscriber sessions 306. At the conclusion, the intermediary node has knowledge of mobile system information regarding the mobile subscriber session 308.

The intermediary node provides the capabilities to inspect adaptive bitrate fragment requests with a network processing unit and to introduce information into the request that is relevant for determining bitrate quality during the request process. The introduction of information includes modifying the requests received from the ABR client before sending the request to the server fulfilling the request. The response can then be fulfilled according to the modified ABR request prepared by the intermediary node. The intermediary node can use information obtained through deep packet inspection to correlate the ABR request fragments with a particular subscriber. The process can work by receiving data traffic on interface 310. The demux manager 304 manages the interface 310 and sorts the data traffic for further processing. In some embodiments, the demux manager 304 provides a rough sorting of traffic into different types of traffic based on shallow packet inspection. This can include reviewing the outermost header information.

The demux manager 304 can then pass the data traffic to the network processing unit 300 for further processing and deep packet inspection. The deep packet inspection can involve matching the higher layer packet headers (e.g., layers 3-7) against criteria to direct and sort the data packets. For example, deep packet inspection of the data traffic can determine when a data packet includes an ABR request. In some embodiments, a packet director/NPU flow can be setup to sort out the ABR requests. A flow can be setup for sorting and further inspecting data packets. For example, a flow can be setup to collect the ABR requests that are received at the intermediary node. Depending on the embodiment, multiple flows can be setup in parallel to sort the ABR requests on a per subscriber basis or the flows can be setup in multiple layers to first sort the ABR requests and then to sort based on other information in the ABR request. Once the ABR request has been inspected and the ABR request is correlated with a particular subscriber, then additional information can be accessed to modify the ABR request.

The flows can be setup to modify ABR requests according to rules that are configured when the flow is setup in the network processing unit. This can include setting the adaptive bitrate request message to a specific bit rate for the requested fragment of content. Setting the processor flow to modify the ABR requests meeting certain requirements is useful to minimize processing latency. As a movie can result in the generation of a number of ABR requests, this can allow the ABR requests to be modified on the fly in hardware to correspond to network policy parameters and subscriber preferences. The flow for a subscriber can be modified based on network level information to update the modifications made to received ABR requests. The flow can be modified based on performance conditions, policy settings, and subscriber conditions.

The flow can be setup the first time an ABR request is received for a particular subscriber. If an ABR request is received and detected during the deep packet inspection process, but no flow exists for the subscriber, then information can be queried to setup the flow. This can involve querying a policy server or subscriber profile server to obtain network policy information and subscriber information as well as obtaining network information available on the intermediary node. The intermediary node can access and receive load information from other network devices that provide network performance information regarding loading and other conditions such as bandwidth and resources available. The performance information can be obtained directly through the PCRF or through some network performance management system, depending on the embodiment. The intermediary node can also track and manage events such as handoffs that can impact packet flow performance to the user equipment. The intermediary node based on its location in the service provider's network can access various types of information that can be leveraged to modify a media protocol to improve the quality of the content delivered to the user equipment. This information can include network performance information and subscriber preference information and parameters.

The network performance information can include condition information about fluctuations in the performance based on the wireless link, a variety of mobility issues, and other user's behavior. The performance of a wireless link can include changes to the performance of the link such as errors, loss of bandwidth, and interference. These wireless conditions can be present even when the user equipment is stationary, but can be exacerbated when the user equipment is in motion. Mobility of the user equipment can also impact performance besides the impacts on the wireless link. Mobility performance can include changes due to handoffs between radio transceivers, gateways, and core network devices as well as inter-radio mobility. The network may include end-to-end system performance as the network can be a closed architecture. Subscriber information and parameters can include Quality of Service (QoS) specification and policy controls for a user equipment as well as subscriber billing plans and subscriber profile data. Other subscriber behavior can also impact network performance, since the network is a shared medium. Other subscriber requests and usage patterns affect the availability of wireless resources to meet subscriber preferences.

Each of these performance conditions can change suddenly, with wireless performance conditions, mobility event conditions, and impacts of other subscriber behavior occurring within the network and not exposed to the user equipment. Even though the user equipment is traditionally where the intelligence is located to determine how each request should look, the user equipment does not have access to information or control over much of the network performance. In order to augment the client intelligence at the user equipment, a modification function can be included in the intermediary node in the network. The modification function can be implemented using a module or logic in the intermediary node.

In FIG. 3, modification function 316 is a module that works in conjunction with network processing unit 300, session 306, and memory 318. The modification function 316 can be implemented using software that is stored in memory 318 and running on processor 320. The modification function 316 can correlate the client preferences with the relevant information about the mobile network including wireless link performance, mobility performance, end-to-end system performance, and other subscriber behavior. This correlation can be executed in order to optimize the performance of both the mobile video stream to the client on the user equipment as well as the overall performance of the network. The modification function 316 can be an adaptive bitrate (ABR) modification function that focuses on the adaptive bitrate protocol. Since a video server is typically a stateless element and the client on the user equipment does not have visibility into the network, the modification function can reside in the core network and interact with mobile QoS requests, policy server messages, and identity server messages.

The modification function can interact with the policy server and/or identity servers to obtain subscriber information including the subscriber profile. The subscriber profile can indicate subscriber preferences that include a preference for a lower bitrate than the network is capable of providing in order to obtain a better utilization of a subscriber's monthly data quota. The modification function can also determine that some aspect of the network will not support the requested bitrate and will modify the request to a bitrate that can be received. The modification function can also determine when the behavior of other subscribers will impact the performance of the network. This can be when additional subscribers are attaching to the network or requesting specific content. The modification function can modify the next ABR request in order to minimize the impact on the video quality. Further intelligence can also be added to the intermediary node to allow for mediation across multiple subscribers to minimize disruptions to the delivery of video in the network.

Figure 4:
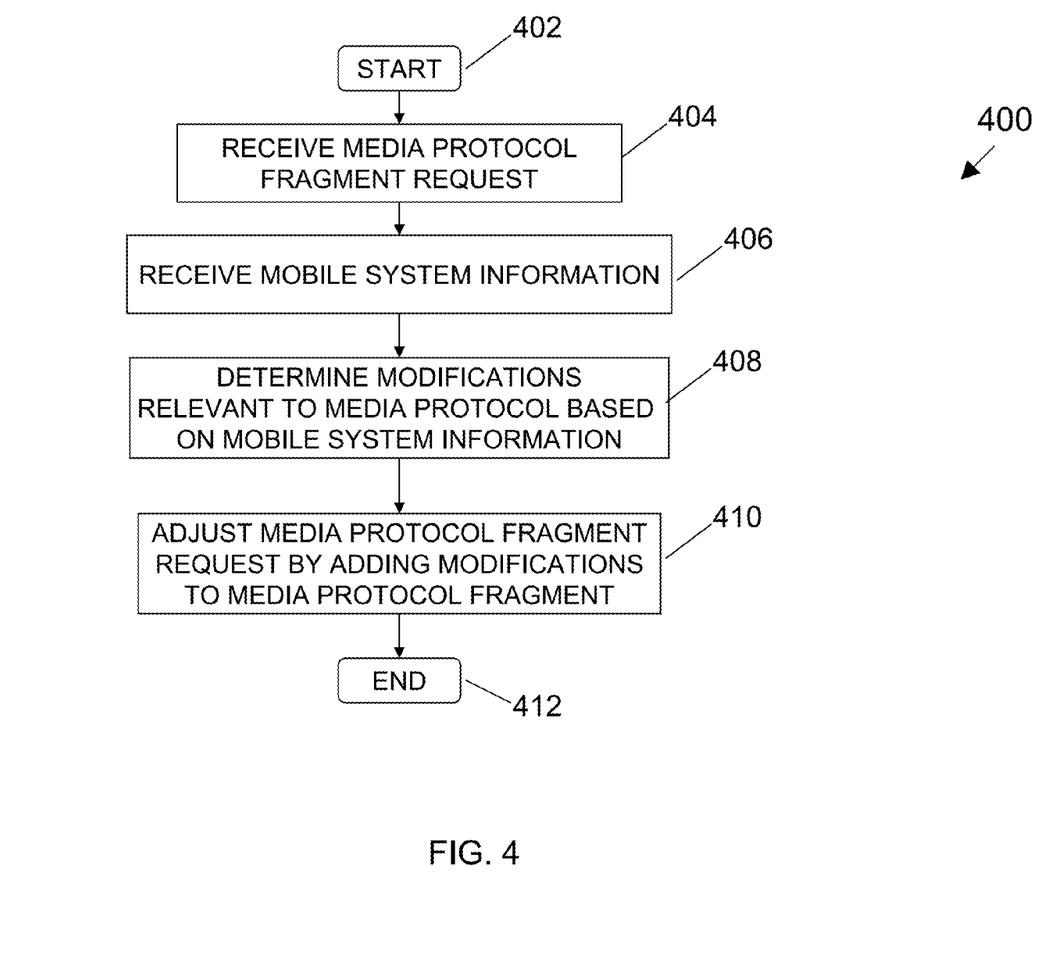
FIG. 4 illustrates a flow diagram of a method for media protocol modification in accordance with some embodiments.

The media protocol modification mechanism can be implemented as shown in FIG. 4. FIG. 4 illustrates a flow diagram of a process 400 for media protocol modification in accordance with some embodiments. In step 402, the modification function 316 receives an ABR fragment request, for example, during an ABR fragment request process. The modification function can receive the ABR fragment request from a variety of sources in the intermediary node depending on the embodiment. For example, the ABR fragment request can come from the network processing unit, the demux manager, or the session. In step 404, the session manager 308 receives mobile system information that can include subscriber information and network performance information. In some embodiments, the network performance information includes information related to wireless performance, mobile performance, end-to-end system performance, and other mobile subscriber behavior. The modification function can also receive mobile Quality of Service (QoS) requests, policy server information, and identity server information.

In step 406, the present system determines modifications relevant to the media protocol, based on the mobile system information. In some embodiments, the session manager 308 uses mobile system information relevant to the mobile subscriber profile to modify media fragment requests. As described above, the session manager 308 may receive the partial or complete mobile subscriber profile from AAA/HSS 140, or from a PCEF or PCRF such as on the PGW/GGSN 214 or PGW/HA 118. The session manager 308 uses the mobile subscriber profile to gather information about the mobile subscriber's available monthly quota. The session manager 308 modifies the ABR protocol fragment request to avoid exceeding the mobile subscriber's monthly quota by preferring a lower bit rate than the mobile network is capable of providing.

In another embodiment, the session manager 308 uses mobile system information to determine that an aspect of the mobile network will not support the requested bit rate to provide a satisfactory user experience for media streaming, and modifies the ABR fragment request so that a lower bitrate can be received. Example mobile system information showing that an aspect of the mobile network will not support the requested bit rate includes (1) eNodeB cell load information, (2) performance characteristics provided based on standards such as Metro Ethernet, and (3) actual bandwidth measurements of the intermediary network. eNodeB cell load information refers to how heavily loaded an eNodeB cell is. A heavily loaded eNodeB cell will take longer to process a request to pass a requested media fragment through to the mobile subscriber. Performance characteristics based on standards such as Metro Ethernet refers to performance characteristics reported based on standards such as IEEE (Institute of Electrical and Electronics Engineers) 802.3ah-2004, later included in the IEEE 802.3-2008 standard. These standards are also referred to as Ethernet in the first mile. Actual bandwidth measurements of the intermediary network are used in a feedback loop to continually provide a threshold or maximum value to refine media protocol fragment requests.

In another embodiment, the session manager 308 uses mobile system information that additional mobile subscribers are in the process of using the mobile network, and preemptively modifies the next ABR protocol fragment request to adjust how the mobile network's current performance will affect media quality. Examples of how mobile subscribers may be using the mobile network include (1) by attaching to the mobile network when they were not previously attached, (2) by requesting additional content over the mobile network, or (3) detaching (which may create additional resources that allow for the modification to be an upgrade, not a downgrade). After a new subscriber attaches to the mobile network when they were not previously attached, the session manager 308 may modify other ABR protocol fragment requests to lower the requested bit rates of media content in anticipation that the new subscriber may use mobile network bandwidth as well. When a subscriber is requesting additional content over the mobile network, the session manager 308 may modify only the ABR protocol fragment requests associated with that subscriber, or the session manager 308 may modify some or all ABR protocol fragment requests. Optionally, the session manager 308 uses information that mobile subscribers are disconnecting or detaching from the mobile network to raise the requested bit rate.

In another embodiment, the session manager uses mobile system information that conditions are consistent and do not require attention, to refrain from analyzing the flow of ABR protocol fragment requests to a mobile subscriber until conditions change which require the session manager to continue analysis. This embodiment allows one set of mobile network resources such as intermediary nodes to serve a larger number of mobile subscribers.

In step 408, the session manager 308 applies the modifications derived from the mobile system information to the ABR fragment request. In some embodiments, the session manager 308 applies the modifications by manipulating ABR fragment requests from the client program running on the user equipment, to update the bit rates requested for the media content.

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, iOS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The intermediary node described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The media protocol modification gateway can be implemented as any combination of the following including an xGSN, an xGW, an xGW-SGW, and an xGW-PGW.

Figure 5:
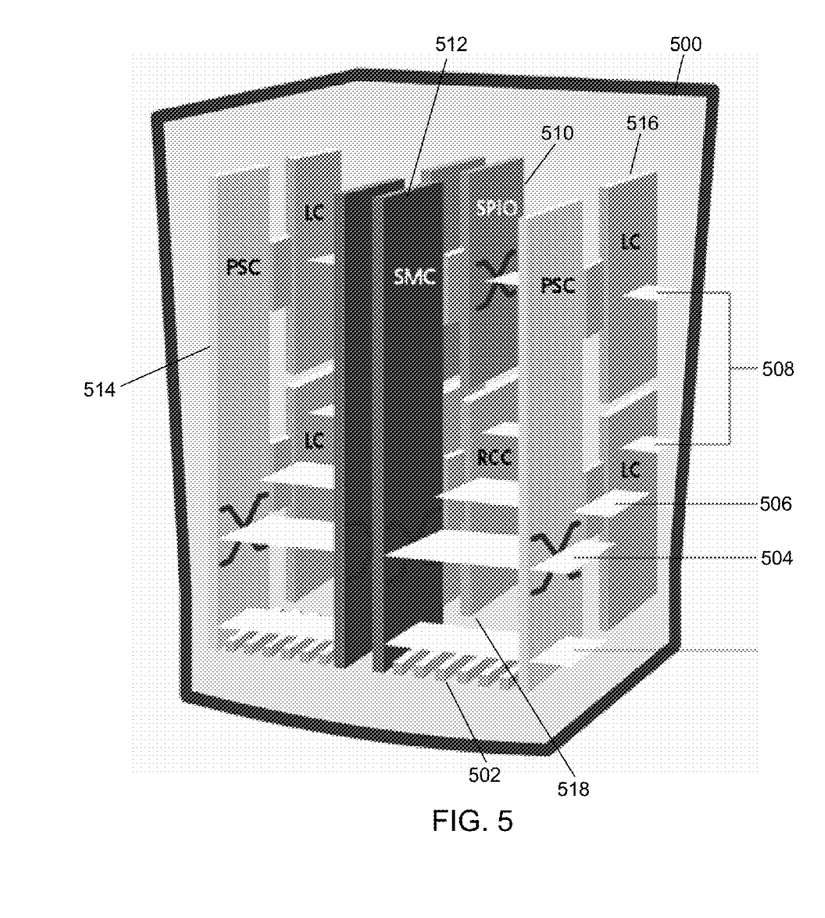
FIG. 5 illustrates a network device configuration for media protocol modification in accordance with some embodiments.

In some embodiments the network device can be implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 5 illustrates the implementation of a network device in accordance with some embodiments. The network device 500 includes slots 502 for loading application cards and line cards. A midplane can be used in the network device to provide intra-network device communications, power connections, and transport paths between the various installed cards. The midplane can include buses such as a switch fabric 504, a control bus 506, a system management bus, a redundancy bus 508, and a time division multiplex (TDM) bus. The switch fabric 504 is an IP-based transport path for user data throughout the network device implemented by establishing inter-card communications between application cards and line cards. The control bus 506 interconnects the control and management processors within the network device. The network device management bus provides management of system functions such as supplying power, monitoring temperatures, board status, data path errors, card resets, and other failover features. The redundancy bus 508 provides transportation of user data and redundancy links in the event of hardware failures. The TDM bus provides support for voice services on the system.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 6:
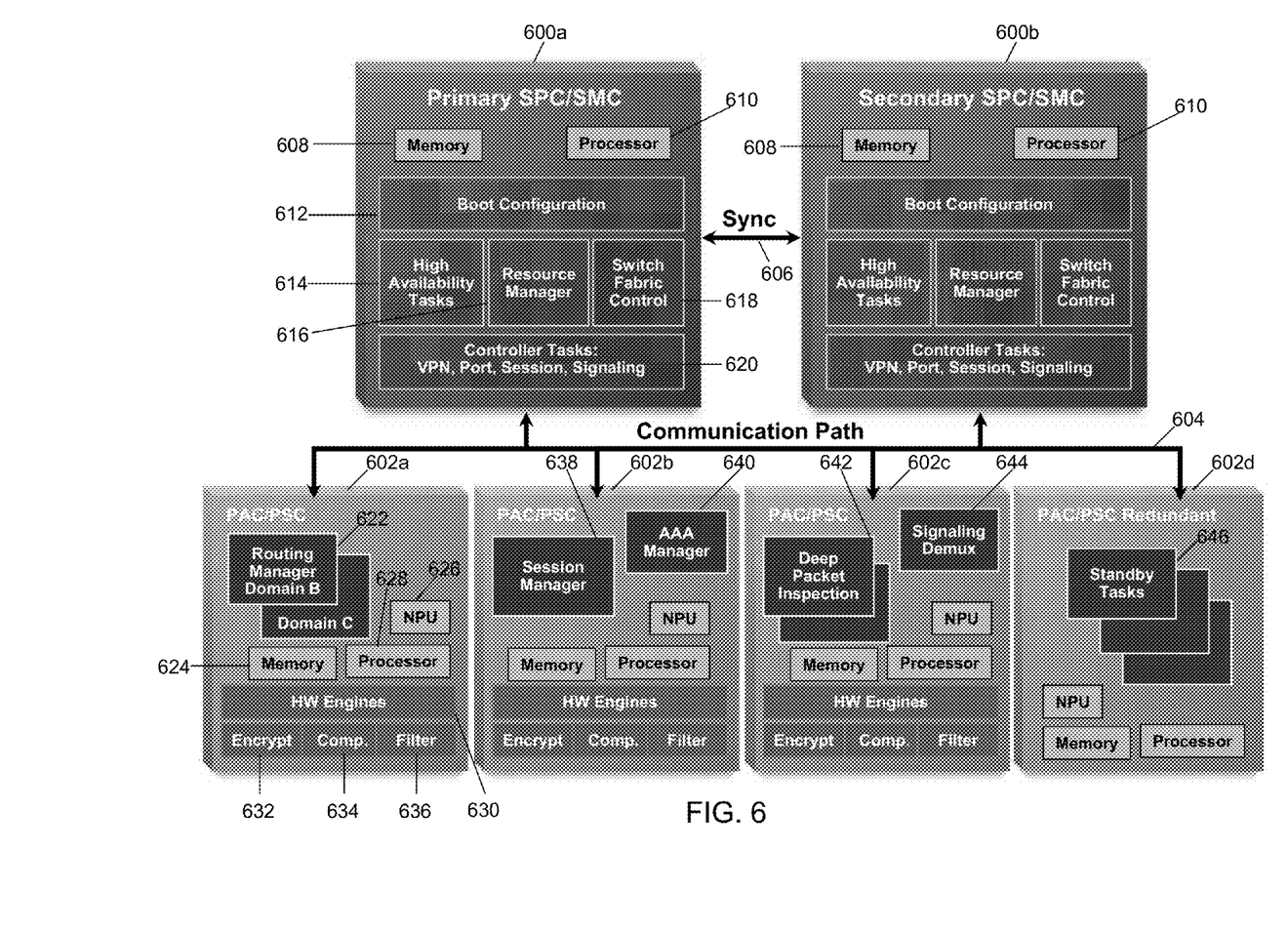
FIG. 6 illustrates an architecture of a network device configuration for media protocol modification in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 6 illustrates a logical view of the software architecture of a network device in accordance with certain embodiments. As shown, the software and hardware can be distributed within the network device and across different circuit boards, processors, and memory. FIG. 6 includes a primary switch processor card (SPC)/system management card (SMC) 600a, a secondary SPC/SMC 600b, PAC/PSC 602a-602d, a communication path 604, and a synchronization path 606. The SPC/SMC 600 include a memory 608, a processor 610, a boot configuration 612, high availability tasks 614, resource manager 616, switch fabric control 618, and controller tasks 620.

The SPC/SMC 600 manage and control the network device including the other cards in the network device. The SPC/SMC 600 can be configured in a primary and secondary arrangement that provides redundancy and failsafe protection. The modules or tasks running on the SPC/SMC 600 are related to network device wide control and management. The boot configuration task 612 includes information for starting up and testing the network device. The network device can also be configured to startup in different configurations and providing different implementations. These can include which functionalities and services are capable of running on the SPC/SMC 600. The high availability task 614 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 600 or a PAC/PSC 602, while some processor intensive tasks can also be performed across multiple PACs/PSCs to utilize multiple CPU resources. Distribution of these tasks is invisible to the user. The switch fabric control 618 controls the communication paths in the network device. The controller tasks module 620 can manage the tasks among the resources of the networks to provide, for example, VPN services, assign ports, and create, delete, and modify sessions for user equipment.

The PAC/PSC 602 are high-speed processing cards that are designed for packet processing and the tasks involved with providing various network functionalities on the network device. The PAC/PSC 602 include a memory 624, a network processing unit (NPU) 626, a processor 628, a hardware engine 630, an encryption component 632, a compression component 634, and a filter component 636. Hardware engines 630 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 602 is capable of supporting multiple contexts. The PAC/PSC 602 are also capable of running a variety of tasks or modules. PAC/PSC 602a provides routing managers 622 with each covering routing of a different domain. PAC/PSC 602b provides a session manager 638 and an AAA manager 640. The session manager 638 manages one or more sessions that correspond to one or more user equipment. A session allows a user equipment to communicate with the network for voice calls and data. The AAA manager 640 manages accounting, authentication, and authorization with an AAA server in the network. PAC/PSC 602 provides a deep packet inspection task 642 and a signaling demux 644. The deep packet inspection task 642 provides inspection of packet information beyond layer 4 for use and analysis by the network device. The signaling demux 644 can provide scalability of services in combination with other modules. PAC/PSC 602d provides redundancy through standby tasks 646. Standby tasks 646 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, the modification function can be located in a PDN gateway to modify media protocol requests.

We claim:

1. A network device comprising:
   an interface configured to communicate packet data including packet data formatted in accordance with a media protocol with a user equipment and a media server;
   a processor in communication with the interface configured to inspect received messages to determine when a received message is a media protocol request message from the user equipment that is intended to request a fragment of a video stream from the media server at a specified bit rate;
   a modification function running on a processor and stored in memory configured to intercept media protocol request messages traveling from the user equipment to the media server and correlate information from the media protocol request message with network performance information and subscriber preference parameters and modifying the specified bit rate of at least one media protocol request message based on the network performance information and subscriber preference parameters.

2. The network device of claim 1, wherein the media protocol request message is an adaptive bitrate message from an adaptive bitrate protocol client running on the user equipment that adapts the bitrate of each adaptive bitrate message to a highest bitrate.

3. The network device of claim 1, wherein the modification function determines that the bit rate in an media protocol request message sent using the adaptive bitrate protocol is higher than can be supported by a radio air link with the user equipment and the modification function modifies the bit rate to a new bit rate based on wireless performance information.

4. The network device of claim 1, wherein the modification function determines that a handoff is about to occur to the user equipment and the modification function modifies the bit rate to a new bit rate based on mobile performance information.

5. The network device of claim 1, wherein the modification function determines that the subscriber preference parameters dictate a threshold bit rate to regulate an amount of data that is used in receiving content and the modification modifies the bit rate to ensure the threshold bit rate is not exceeded.

6. The network device of claim 1, wherein the modification function determines network congestion will impact multiple subscribers and the modification function modifies the bit rate of the media protocol request message to minimize the network congestion.

7. The network device of claim 1, wherein the modification function uses an algorithm to predict video quality received by the user equipment based on the network performance information and the modification function modifies the bit rate of the media protocol request message based on the network performance and the subscriber information.

8. A method comprising:
   inspecting messages received to determine when a received message is a media protocol request message from the user equipment that is intended to request a fragment of a video stream from the media server at a specified bit rate;
   receiving a media protocol request message from a user equipment that is traveling to a media server to request a fragment of a video stream at a specified bit rate;
   correlating information from the media protocol request message with network performance information and subscriber preference parameters; and
   modifying the specified bit rate of at least one media protocol request message based on the network performance information and subscriber preference parameters.

9. The method of claim 8, wherein the media protocol request message is an adaptive bitrate message from an adaptive bitrate protocol client running on the user equipment that adapts the bitrate of each adaptive bitrate message to a highest bitrate.

10. The method of claim 8, further comprising determining that the bit rate in an media protocol request message sent using the adaptive bitrate protocol is higher than can be supported by a radio air link with the user equipment and modifying the bit rate to a new bit rate based on wireless performance information.

11. The method of claim 8, further comprising determining that a handoff is about to occur to the user equipment and modifying the bit rate to a new bit rate based on mobile performance information.

12. The method of claim 8, further comprising determining that the subscriber preference parameters dictate a threshold bit rate to regulate an amount of data that is used in receiving content and modifying the bit rate to ensure the threshold bit rate is not exceeded.

13. The method of claim 8, further comprising determining that network congestion will impact multiple subscribers and modifying the bit rate of the media protocol request message to minimize the network congestion.

14. The method of claim 8, further comprising predicting video quality received by the user equipment based on the network performance information and modifying the bit rate of the media protocol request message based on the network performance and the subscriber information.

15. One or more non-transitory computer-readable storage media encoded with computer program for execution and when executed by a computer operable to:
   inspect messages received to determine when a received message is a media protocol request message from the user equipment that is intended to request a fragment of a video stream from the media server at a specified bit rate;
   receive a media protocol request message from a user equipment that is traveling to a media server to request a fragment of a video stream at a specified bit rate;
   correlate information from the media protocol request message with network performance information and subscriber preference parameters; and
   modify the specified bit rate of at least one media protocol request message based on the network performance information and subscriber preference parameters.

16. The one or more non-transitory computer-readable storage media of claim 15, wherein the media protocol request message is an adaptive bitrate message from an adaptive bitrate protocol client running on the user equipment that adapts the bitrate of each adaptive bitrate message to a highest bitrate.

17. The one or more non-transitory computer-readable storage media of claim 15, further comprising determining that the bit rate in an media protocol request message sent using the adaptive bitrate protocol is higher than can be supported by a radio air link with the user equipment and modifying the bit rate to a new bit rate based on wireless performance information.

18. The one or more non-transitory computer-readable storage media of claim 15, further comprising determining that the subscriber preference parameters dictate a threshold bit rate to regulate an amount of data that is used in receiving content and modifying the bit rate to ensure the threshold bit rate is not exceeded.

19. The one or more non-transitory computer-readable storage media of claim 15, further comprising determining that network congestion will impact multiple subscribers and modifying the bit rate of the media protocol request message to minimize the network congestion.

20. The one or more non-transitory computer-readable storage media of claim 15, further comprising predicting video quality received by the user equipment based on the network performance information and modifying the bit rate of the media protocol request message based on the network performance and the subscriber information.

* * * * *